United States Patent
Okawa

Patent Number: 5,223,462
Date of Patent: Jun. 29, 1993

[54] DIELECTRIC CERAMIC COMPOSITION

[75] Inventor: Takashi Okawa, Kagoshima, Japan

[73] Assignee: Kyocera Corporation, Kyoto, Japan

[21] Appl. No.: 825,801

[22] Filed: Jan. 21, 1992

Related U.S. Application Data

[63] Continuation of Ser. No. 486,823, Mar. 1, 1990, abandoned, which is a continuation of Ser. No. 179,433, Apr. 8, 1988, abandoned, which is a continuation-in-part of Ser. No. 158,026, Feb. 12, 1988, Pat. No. 4,866,017, which is a continuation of Ser. No. 840,431, Mar. 17, 1986, abandoned.

[30] Foreign Application Priority Data

May 18, 1985 [JP] Japan .................. 60-55544

[51] Int. Cl.$^5$ .............................. C04B 35/46
[52] U.S. Cl. ............................. 501/138; 501/139
[58] Field of Search ................. 501/134, 138, 139

[56] References Cited

U.S. PATENT DOCUMENTS

| | | | |
|---|---|---|---|
| 3,041,189 | 6/1962 | Herbert | 501/138 |
| 4,353,047 | 10/1982 | Noguchi et al. | 501/138 |
| 4,459,364 | 7/1984 | McSweeney et al. | 501/138 |
| 4,500,942 | 2/1985 | Wilson | 501/138 |
| 4,506,206 | 3/1985 | Hodgkins et al. | 501/135 |
| 4,522,927 | 6/1985 | Kashima et al. | 501/138 |
| 4,535,064 | 8/1985 | Yoneda | 501/139 |
| 4,607,018 | 8/1986 | Nishioka et al. | 501/135 |
| 4,713,726 | 12/1987 | Sasazawa | 501/138 |
| 4,749,669 | 6/1988 | Nishigaki et al. | 501/139 |
| 4,824,813 | 4/1989 | Yano et al. | 501/138 |
| 4,866,017 | 9/1989 | Okawa | 501/139 |
| 5,077,247 | 12/1991 | Sato et al. | 501/138 |

FOREIGN PATENT DOCUMENTS

| | | | |
|---|---|---|---|
| 2343142 | 3/1975 | Fed. Rep. of Germany | 501/139 |
| 1431103 | 4/1976 | United Kingdom | 501/139 |

*Primary Examiner*—Mark L. Bell
*Assistant Examiner*—Deborah Jones
*Attorney, Agent, or Firm*—Spensley Horn Jubas & Lubitz

[57] ABSTRACT

A dielectric ceramic composition of matter characterized in that the composition of matter contains 0.003 to 0.3% by weight manganese in addition to the main composition of matter represented by the composition formula $xBaO \cdot yNd_2O_3 \cdot zTiO_2 \cdot wBi_2O_3$ wherein $0.110 \leq x \leq 0.170$, $0.120 \leq y \leq 0.185$, $0.630 \leq z \leq 0.710$, $0.020 \leq w \leq 0.090$, and $x+y+z+w=1$. This composition of matter is high in dielectric constant, low in the temperature dependency of resonance frequency in a resonator, and high in Q-value.

9 Claims, No Drawings

DIELECTRIC CERAMIC COMPOSITION

This is a continuation of application Ser. No. 07/486,823 filed on Mar. 1, 1990 now abandoned, which is a continuation of application Ser. No. 07/179,433 filed on Apr. 8, 1988, now abandoned, which is a continuation-in-part application of application Ser. No. 07/158,026, filed Feb. 12, 1988, now U.S. Pat. No. 4,866,017, which is a continuation application of Ser. No. 06/840,431, filed Mar. 17, 1986, now abandoned.

BACKGROUND OF THE INVENTION

1. Field of the Invention

This invention relates to a dielectric ceramic composition of matter and more particularly to a dielectric ceramic composition of matter useful as a material for a resonator and a circuit substrate in the microwave frequency band.

2. Prior art

In recent years, dielectric ceramics have found wide application in the microwave frequency band such as in the development of a microwave circuit into use of integrated circuit along with the practical use of an automobile telephone, cordless telephone, personal radio set, and satellite broadcast receiver; in the increased range of use of Gunn oscillators; and in use for gallium aresnide field-effect transistor (GaAs FET) driven oscillators and the like.

Such a dielectric ceramic for microwave use is chiefly used in a resonator, and characteristic features demanded of the resonator are included under the following three characteristics that (1) the dielectric ceramic should have the highest possible dielectric constant because, in the dielectric, the wave length is shortened to $1/\sqrt{\epsilon\tau}$ (wherein $\epsilon\tau$ represents a dielectric constant) and because a ceramic larger in dielectric constant facilitates so much the greater reduction in size if the ceramic is the same in resonance frequency; (2) the ceramic should be small in dielectric loss with respect to high frequency; and (3) it should be small in its resonance frequency change according to temperature, namely, small and stable in the temperature dependency of its dielectric constant. And if a resonator is on the order of 1 GHz considered to be in a relatively low-frequency band which is used for an automobile telephone, personal radio set, cordless telephone, and the like, even in the microwave frequency band, the wavelength to be applied to the low-frequency band is considerably increased in wavelength, and accordingly miniaturization of the resonator requires considerably high dielectric constant.

Heretofore, it was known that the dielectric ceramics of the type described above are, for example, a BaO-TiO$_2$ based material; BaO-REO-TiO$_2$ based material (wherein REO represents an oxide of rare-earth element and the same shall apply hereinafter); and (BaSrCa)(ZrTi)O$_3$ based material and so on.

But while BaO-TiO$_2$ based material and (BaSrCa)(ZrTi)O$_3$ based material each have an excellent low dielectric loss in a microwave frequency band of 4~10 GHz, they are as low in dielectric constant as 29~40, and particularly miniaturization of the resonator in a frequency band of the order of 1 GHz poses a problem in point of practical use. An increase in dielectric constant tends to extremely deteriorate the temperature characteristic or dielectric loss of resonance frequency.

On the other hand, systematic experiment reports on the BaO-REO-TiO$_2$ based material [R. L. Bolton "Temperature Compensating Ceramic Capacitors in the System Baria-Rare Earth Oxide-Titania" Ph.D. Thesis, University of Illinois-Urbana, 1968 and Drago Kolar et al., Ber Deutsch Keram. Ges., 55. 346~348 (1978)] are available. The reports are all based on the measurement made at 1 MHz and no application of the material in a microwave frequency band of the order of 1 GHz was contemplated. When the material is used in the form of a dielectric resonator, the dielectric material is as high in dielectric constant as 70~80 and also small in dielectric loss, but is so very high in the temperature coefficient of dielectric constant as N 100~N 150 ppm/°C. (wherein N represents negative) on the N side, and the temperature coefficient ($+\tau$) of resonance frequency becomes high on the P (positive) side. For example, when the resonator is used in a band-pass filter as of a personal radio set, a transmitting and receiving band deflects from a specified frequency band because of a temperature change and enters the adjacent frequency band, with the result that it becomes difficult to send and receive signals, posing a problem in point of practical use. Also, even if an amount of Nd$_2$O$_3$ is for example increased to modify ($\tau$f) to NPO (in the direction of 0), the dielectric material is subject to reduced dielectric constant and increased dielectric loss. Accordingly, the dielectric ceramic composition of matter for use in microwaves having the above-mentioned three characteristics has not yet been developed.

SUMMARY OF THE INVENTION

This invention has been worked out in view of the disadvantages described above, and is intended to provide a dielectric ceramic composition of matter for use in microwaves which is high in dielectric constant (not less than 70), as low in dielectric loss as possible, small and stable in the temperature dependency of dielectric constant, and small and stable in the temperature dependency of resonance frequency.

The present inventor has made intense researches into the foregoing problems and has worked out this invention by finding that a dielectric ceramic composition of matter having high dielectric constant, small in the temperature dependency of dielectric constant and in the temperature dependency of resonance frequency of a resonator, and having a high Q-value can be obtained by adding manganese to a main composition comprising BaO, Nd$_2$O$_3$, TiO$_2$ and Bi$_2$O$_3$.

Namely, this invention provides a dielectric ceramic composition of matter characterized in that the composition of matter contains 0.003 to 0.3% by weight manganese in addition to the main composition of matter represented by the composition formula xBaO·yNd$_2$O$_3$·zTiO$_2$·wBi$_2$O$_3$ wherein $0.110 \leq x \leq 0.170$, $0.120 \leq y \leq 0.185$, $0.630 \leq z \leq 0.710$, $0.020 \leq w \leq 0.090$ and $x+y+z+w=1$.

The present inventor previously proposed by a Japanese patent application Ser. No. 60-55544, a dielectric composition of matter having a high dielectric constant and improvements in temperature characteristic by selecting Nd$_2$O$_3$ as REO in the BaO-REO-TiO$_2$ based composition and adding Bi$_2$O$_3$ to the Nd$_2$O$_3$ to improve the temperature characteristic of the Nd$_2$O$_3$ (when the temperature characteristic of dielectric constant is shifted to the P side, namely, when the characteristic is used for the purpose of a dielectric resonator, the temperature coefficient $\tau$f of resonance frequency is shifted to the N side). This invention is based on the proposal, and further improves a Q-value greatly and also a dielectric constant by adding manganese (Mn) to a dielectric composition of matter consisting essentially of BaO, $TiO_2$, $Nd_2O_3$, and $Bi_2O_3$. The addition of manganese can enlarge the range of allowance of practical use of $TiO_2$.

As a result, according to the dielectric ceramic composition of matter of the invention, manganese in the amount of 0.003 to 0.3% by weight, preferably 0.1 to 0.2% by weight is mixed with the main composition of matter represented by the composition formula $xBaO \cdot yNd_2O_3 \cdot ztiO_2 \cdot wBi_2O_3$ wherein $0.110 \leq x \leq 0.170, 0.120 \leq y \leq 0.185, 0.630 \leq z \leq 0.710, 0.020 \leq w \leq 0.090$, and $x+y+z+w=1$. The reason that each of the above compositions is limited to the above range of numerical values is that when $x > 0.170$, the temperature coefficient $\tau f$ of resonance frequency is increased on the P side and Q-value is reduced. When $x < 0.110$, Q-value is also reduced. When $y > 0.185$, dielectric constant is reduced. When $y < 0.120$, Q-value is reduced and $\tau f$ is increased on the P side. When $z < 0.710$, $\tau f$ is increased on the P side, and even when $z < 0.630$, $\tau f$ is increased on the P side and dielectric constant is also reduced. When $w > 0.090$, Q-value and dielectric constant are reduced. When $w < 0.020$, $\tau f$ is increased on the P side. On the other hand, when the amount of manganese is outside the above range of numerical values, Q-value is reduced, and no effect is noticed of improvement in Q-value by the addition of manganese. Addition of manganese, particularly the addition of manganese in the form of a compound is desirable, and for example, the addition is effected in the form of $MnCO_3$, $MnO_2$, $MnCl_2$, $Mn(NO_3)_2$, and $MnSO_4$. In this regard, the manganese compound is added in an amount such that Mn mole ratio in the compound is stoichiometrically within the range specified above.

EXAMPLES

Examples will be described in the following.

(I) Preparation of Dielectric Ceramics

1) High purity barium carbonate ($BaCO_3$), neodymium oxide ($Nd_2O_3$), titanium oxide ($TiO_2$), bismuth oxide ($Bi_2O_3$), and manganese carbonate ($MnCO_3$) were weighed at a ratio of x, y, z, w and t shown respectively in Table 1.

2) The above starting materials were subjected to wet mixing by a ball mill around the clock and the mixture was dried.

3) The mixture thus obtained was calcined at 900° C. for two hours. $Bi_2O_3$ was substantially added to the interrelated group of $BaO-Nd_2O_3-TiO_2$ in the form of $BiTi_{3/4}O_3$ by the calcination.

4) The calcined mixture was subjected to wet crushing by a ball mill around the clock and was dried.

5) About one % by weight of binder was added to the dried powder thus obtained and was uniformed in grain size.

6) The powder was then molded under a pressure of about 800 kg/cm² and fired at 1200~1450° C. in the air for about two hours. (II) The dielectric ceramics thus obtained were measured in the band of resonance frequency of 2.5~3.0 GHz by a dielectric cylinder resonator method (post resonator method) with reference to the dielectric constant, dielectric loss, and temperature coefficient of resonance frequency.

The results are shown in Table 1.

TABLE 1

| Sample No. | Main composition (mole ratio) | | | | Mn | | | Temperature of Resonance Frequency |
|---|---|---|---|---|---|---|---|---|
| | x | y | z | w | t | $\epsilon r$ | Q | $\tau f$ (ppm/C.) |
| 1 | 0.153 | 0.153 | 0.661 | 0.033 | 0.1 | 91.7 | 1885 | −0.9 |
| 2 | 0.139 | 0.185 | 0.646 | 0.030 | 0.1 | 70.3 | 544 | −0.1 |
| 3 | 0.117 | 0.176 | 0.682 | 0.025 | 0.1 | 81.5 | 875 | −7.6 |
| 4 | 0.146 | 0.146 | 0.659 | 0.049 | 0.1 | 96.8 | 1358 | +0.7 |
| *5 | 0.133 | 0.133 | 0.706 | 0.028 | 0 | 101.4 | 29 | +34.5 |
| 6 | 0.133 | 0.133 | 0.706 | 0.028 | 0.1 | 99.0 | 1946 | +29.6 |
| *7 | 0.141 | 0.141 | 0.687 | 0.031 | 0 | 100.9 | 104 | +10.2 |
| 8 | 0.141 | 0.141 | 0.687 | 0.031 | 0.003 | 101.3 | 1814 | +8.5 |
| 9 | 0.142 | 0.142 | 0.685 | 0.031 | 0.1 | 98.0 | 1866 | +6.3 |
| 10 | 0.142 | 0.142 | 0.685 | 0.031 | 0.3 | 96.8 | 1797 | +4.7 |
| *11 | 0.142 | 0.142 | 0.685 | 0.031 | 0.6 | 91.8 | 302 | +2.5 |
| 12 | 0.116 | 0.156 | 0.638 | 0.09 | 0.1 | 85.4 | 927 | +5.3 |
| *13 | 0.181 | 0.135 | 0.645 | 0.039 | 0.1 | 100.1 | 99 | +2.2 |
| *14 | 0.101 | 0.152 | 0.671 | 0.076 | 0.1 | 90.6 | 440 | +24.9 |
| *15 | 0.134 | 0.190 | 0.646 | 0.030 | 0.1 | 60.1 | 610 | +10.4 |
| *16 | 0.180 | 0.113 | 0.677 | 0.030 | 0.1 | 105.9 | 300 | +34.2 |
| *17 | 0.126 | 0.126 | 0.720 | 0.028 | 0.1 | 106.8 | 1358 | +44.5 |
| *18 | 0.181 | 0.181 | 0.600 | 0.039 | 0.1 | 56.1 | 577 | +83.9 |
| *19 | 0.148 | 0.148 | 0.593 | 0.111 | 0.1 | 54.0 | 86 | +11.3 |
| *20 | 0.163 | 0.163 | 0.665 | 0.009 | 0.1 | 85.8 | 2104 | +32.2 |

*indicated saple numbers designate dielectric compositions of matter which are outside the scope of the invention.

As apparent from Table 1, comparison between No. 5 and No. 6 or between No. 7 and No. 8 reveals that there is almost no change in dielectric constant and in the temperature characteristic $\tau f$ of resonance frequency but there is a great increase in Q-value due to the addition of manganese. An excess of manganese over 0.3% by weight tends to exceedingly reduce an effect of improving Q-value.

As shown by Nos. 13 to 20, deviation of x, y, z and w in the main composition from the aforesaid range increases dielectric loss, reduces Q-value or dielectric constant, and increases $\tau f$ and thus produces no satisfactory result.

The invention has made it possible to achieve the dielectric material in which dielectric constant $\epsilon > 70$, Q $> 500$, and $\tau f < 30$.

As described in detail, the invention provides the dielectric material which not only improves Q-value, but is high in dielectric constant and low in the temperature dependency of resonance frequency by adding a specified amount of manganese to a composition consisting essentially of BaO, $Nd_2O_3$, $TiO_2$, and $BiO_3$. The dielectric material thus obtained renders it sufficiently possible to miniaturize the resonator of the order of 1 GHz, and can remove the instability of the product characteristics resulting from errors in mixing of each component in view of the fact that the addition of manganese enables an increase in the allowable amount of $TiO_2$ within the composition range of each constituent, particularly in the amount of $TiO_2$, satisfactory in comparison with the case wherein no manganese is added to the composition.

What is claimed is:

1. In a microwave resonator device having a dielectric ceramic composition of matter, the improvement wherein said composition of matter is suitable for use in the microwave frequency band and consists essentially of a main composition represented by the composition formula $xBaO \cdot yNd_2O_3 \cdot zTiO_2 \cdot wBi_2O_3$ wherein $0.139 \leq x \leq 0.170$, $0.120 \leq y \leq 0.185$, $0.630 \leq z \leq 0.661$, $0.020 \leq w \leq 0.090$, and $x+y+z+w=1$; and 0.003 to 0.3% by weight manganese, based on the weight of said main composition.

2. In a microwave circuit device having a dielectric ceramic composition of matter, the improvement wherein said dielectric ceramic composition of matter is suitable for use in the microwave frequency band and consists essentially of a main composition represented by the composition formula $xBaO \cdot yNd_2O_3 \cdot zTiO_2 \cdot wBi_2O_3$ wherein $0.139 \leq x \leq 0.170$, $0.120 \leq y \leq 0.185$, $0.630 \leq z \leq 0.661$, $0.020 \leq w \leq 0.090$, and $y+y+z+w=1$; and manganese in an amount within the range defined by +, wherein $0.003 \leq + \leq 0.1$ by weight, based on the weight of said main composition.

3. A microwave circuit device as claimed in claim 2, wherein the dielectric ceramic material comprises a microwave circuit substrate.

4. A microwave circuit device as claimed in claim 2, wherein the dielectric ceramic material comprises a microwave resonator.

5. A microwave circuit device as claimed in claim 2, wherein the improved dielectric ceramic composition has a temperature coefficient + of the resonance frequency of <30 ppm/°C.

6. A microwave circuit device as claimed in claim 2, wherein the improved dielectric ceramic composition has a dielectric constant of at least 70 and a Q value of greater than 500.

7. In a microwave resonator device having a dielectric ceramic composition of matter, the improvement wherein said dielectric ceramic composition of matter is suitable for use in the microwave frequency band and consists essentially of a main composition represented by the composition formula $xBaO \cdot yNd_2O_3 \cdot zTiO_2 \cdot wBi_2O_3$ wherein $0.139 \leq x \leq 0.170$, $0.120 \leq y \leq 0.185$, $0.630 \leq z \leq 0.661$, $0.020 \leq w \leq 0.090$, and $x+y+z+w=1$; and manganese in an amount within the range defined by +, wherein $0.003 \leq + \leq 0.1$ by weight, based on the weight of said main composition.

8. A microwave resonator device as claimed in claim 7, wherein the improved dielectric ceramic composition has a temperature coefficient $\tau f$ of the resonance frequency of <30 ppm/°C.

9. A microwave resonator device as claimed in claim 7, wherein the improved dielectric ceramic composition has a dielectric constant of at least 70 and a Q value greater than 500.

* * * * *